United States Patent [19]

Sakamoto

[11] Patent Number: 4,947,445
[45] Date of Patent: Aug. 7, 1990

[54] SHADING CORRECTION USING VARIABLE SLICING THRESHOLD

[75] Inventor: Masahiro Sakamoto, Tokyo, Japan

[73] Assignee: Canon Kabushiki Kaisha, Tokyo, Japan

[21] Appl. No.: 188,755

[22] Filed: May 2, 1988

Related U.S. Application Data

[63] Continuation of Ser. No. 706,179, Feb. 27, 1985, abandoned.

[30] Foreign Application Priority Data

Mar. 1, 1984 [JP] Japan .................................. 59-37342

[51] Int. Cl.⁵ .............................................. G06K 9/38
[52] U.S. Cl. ........................................ 382/50; 382/54
[58] Field of Search ............... 358/163, 280, 282, 284; 382/50, 54

[56] References Cited

U.S. PATENT DOCUMENTS

| | | |
|---|---|---|
| 3,976,833 | 8/1976 | Lavery .................................. 358/282 |
| 4,149,143 | 4/1979 | Nagano et al. ........................ 382/53 |
| 4,174,528 | 11/1979 | White ................................... 358/282 |
| 4,408,231 | 11/1983 | Bushaw et al. ........................ 382/50 |
| 4,420,742 | 12/1983 | Tapauchi et al. ...................... 382/50 |
| 4,454,539 | 6/1984 | Feddle et al. ......................... 358/282 |
| 4,520,395 | 5/1985 | Abe ....................................... 358/163 |
| 4,524,388 | 6/1985 | Abe et al. ............................. 358/163 |
| 4,554,583 | 11/1985 | Saitoh et al. ......................... 358/163 |
| 4,691,239 | 9/1987 | Nelson et al. ........................ 358/282 |
| 4,717,963 | 1/1988 | Koizumi ................................ 358/282 |
| 4,748,677 | 5/1988 | Yokomizo .............................. 382/50 |

*Primary Examiner*—Leo H. Boudreau
*Assistant Examiner*—Jose L. Couso
*Attorney, Agent, or Firm*—Fitzpatrick, Cella, Harper & Scinto

[57] ABSTRACT

An image processing apparatus has a reader for photoelectrically reading an image, a reference member of a reference density, a memory for storing the status of change of the output signals obtained by reading the reference member using the reader, and a binary encoder for binary encoding the output signals of the reader according to the stored content of memory.

9 Claims, 3 Drawing Sheets

SHADING CORRECTION USING VARIABLE SLICING THRESHOLD

This application is a continuation of application Ser. No. 706,179 filed Feb. 27, 1985 now abandoned.

BACKGROUND OF THE INVENTION

1. Field of the Invention

The present invention relates to an image processing apparatus for electrically processing an original image such as a facsimile, a digital copier or the like, and more particularly to such image processing apparatus capable of correcting unevenness in the image signals obtained by reading an original image with an image sensor.

2. Description of the Prior Art

There are already known various apparatus for electrical image processing such as facsimile or copier, and, in most of such apparatus, an original image is illuminated by a light source and the resulting reflected light is read by an image sensor such as a charge-coupled device (CCD). Uniform image signals cannot often been obtained, however, because of uneven brightness of the light source such as fluorescent lamp over the entire length thereof, uneven light transmission of the lens resulting from vignetting of the lens, and uneven sensitivity of the image sensor. In the following description, the unevenness in the image signals will be called shading error. For the purpose of obtaining satisfactory image signals, there has been proposed a device for electrically correcting said shading error.

FIG. 1 shows an example of conventional image processing apparatus capable of electrical shading correction.

In FIG. 1, the light reflected from an original image illuminated by a light source is focused, through an unrepresented optical system composed of lenses, prisms etc., onto a CCD sensor 1 functioning as a photoelectric converting element. The CCD sensor 1 is composed of a linear array of plural photosensitive elements, each of which reads a pixel of the image.

The timing of image data reading from the CCD sensor 1 is controlled by a read controller 7. The output signals of the CCD sensor 1 are amplified to a determined level by an amplifier 3 and then binary digitized by a comparator 11. The shading error is corrected by regulating the reference voltage of said comparator 11.

The reference voltage of the comparator 11 is determined according to shading error data stored in a memory 9, composed for example of a random access memory. More specifically, the read controller 7 coordinates the data output from the CCD sensor 1 with the readout of the shading error data from the memory 9 to regulate the reference voltage for binary encoding in the comparator 11 through an A/D, D/A converter 5 in relation to the image reading position of the CCD sensor 1, thereby correcting the shading error in response for example to the intensity distribution of the light source.

The shading error data are entered by scanning a reference member such as a standard white board with the CCD sensor 1, prior to the reading of the original image. The analog output signals obtained from the CCD sensor 1 by reading said reference member are converted, by the A/D-D/A converter 5, into digital signals of plural bits per pixel, and such digital signal for example of a line are stored in the memory 9 in relation to the image reading position.

In the above-described image processing apparatus, high-speed A/D and D/A converters are required for achieving a higher image reading speed. In general, such high-speed A/D and D/A converters are complex in structure and expensive, and increase the cost of the entire image processing apparatus.

Also, the memory for storing the shading distortion data is another factor of cost increase, since it requires a considerably large capacity for storing the digital data of an entire line, including plural bits for each pixel.

SUMMARY OF THE INVENTION

In consideration of the foregoing, an object of the present invention is to provide an image processing apparatus which is simple and inexpensive in structure and has a high speed in performance, and which is capable of secure correction of shading error.

Another object of the present invention is to provide an image processing apparatus capable of providing satisfactory binary image output signals.

Still another object of the present invention is to provide an image processing apparatus capable of shading error correction in response to the image to be read.

Still another object of the present invention is to provide an image processing apparatus adapted for use as an original image reader for example in a facsimile or a digital copier.

According to the present invention, the foregoing objects are attained by providing an image processing apparatus having means for reading an image, a reference member, memory means for storing data indicating status of change of output from the reading means attained by reading the reference member, charge-discharge means which charges or discharges, respectively, in response to data read out from the memory means, and means for removing a shading error from signals obtained by reading an original using the reading means, in accordance with an output of the charge-discharge means. This approach makes possible high speed, high resolution shading correction using a relatively small memory and other relatively inexpensive components.

The foregoing and still other objects, features and advantage of the present invention will become fully apparent from the following description.

DETAILED DESCRIPTION OF THE PREFERRED EMBODIMENTS

Figure 1:
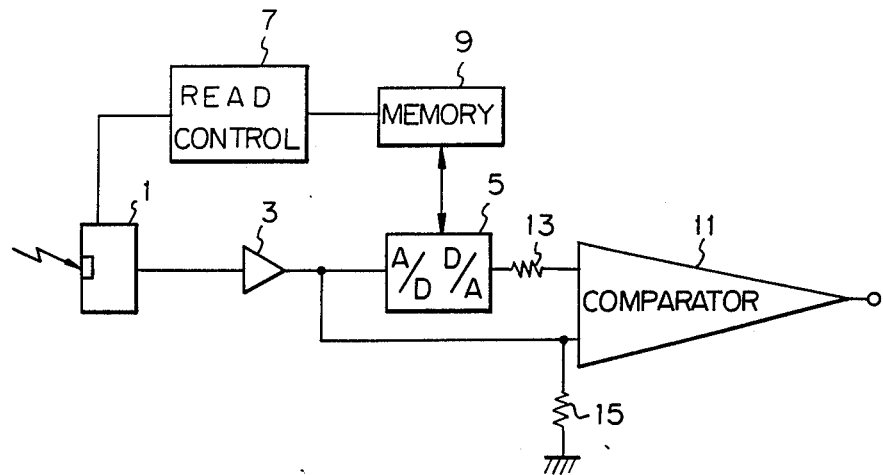
FIG. 1 is a block diagram of a conventional image processing apparatus.

Now the present invention will be clarified in greater detail by an embodiment thereof shown in the attached drawing, wherein the same or equivalent components as those shown in FIG. 1 are represented by the same numbers and will not be explained in particular in the following description.

Figure 2:
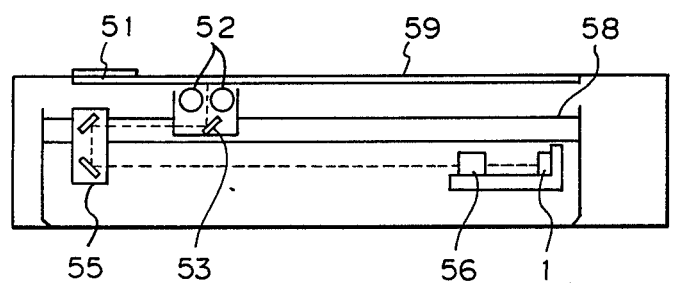
FIG. 2 is a schematic block diagram of an original reading apparatus embodying the present invention.

FIG. 2 is a schematic block diagram of an original image reading apparatus in which the present invention is applicable.

An original document placed, with an imagebearing face thereof downwards, on an original table 59 is illuminated by a fluorescent lamp 52, and the reflected light is guided through mirrors 53, 55 and an optical lens 56 to the CCD sensor 1 along a brokenlined optical path, thus forming an image of the original on said CCD sensor. The fluorescent lamp 52 and mirrors 53, 55 are moved by an unrepresented motor along a guide rail 58 to scan the original document on the original table 59. The CCD sensor 1 reads the original image by converting the intensity of the reflected light of a line into an electrical signal for each pixel. In the present embodiment the shading error resulting from unevenness caused by smears on the mirrors 53, 55, and from uneven distribution of transmission of the lens 57 are collectively eliminated electrically. More specifically, in the present embodiment, a reference member 51 for measuring the shading error data positioned outside an original placing area is read by the CCD sensor 1 prior to the original scanning, thereby correcting the shading error in the image signals obtained by reading the original. Said reference member 51 is composed of a plate evenly painted in white or gray and serves as a standard for measuring the shading error data.

Figure 3:
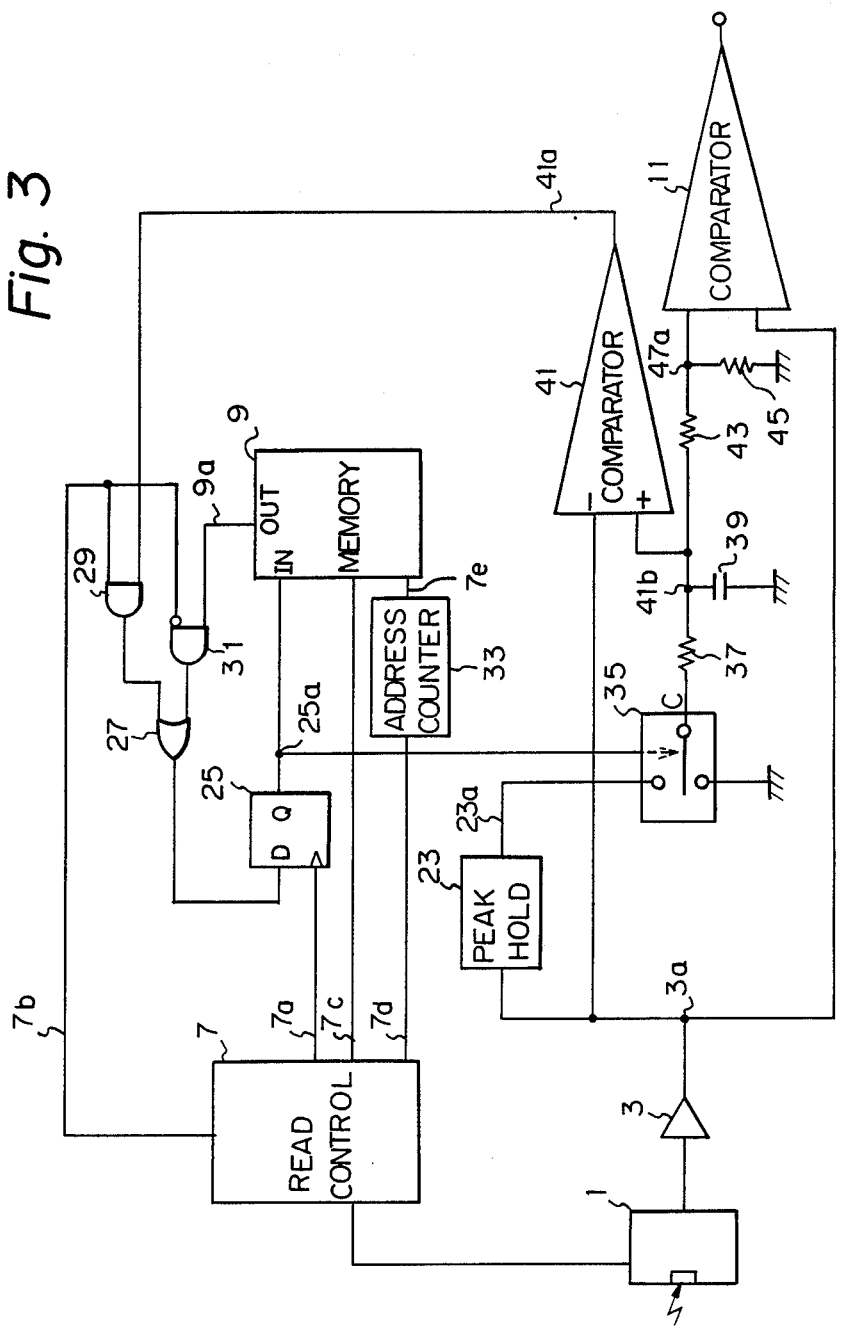
FIG. 3 is a block diagram of an image processing apparatus of the present invention.

FIG. 3 is a block diagram showing an embodiment of the circuit for correcting the shading error in the output signals of the CCD sensor 1 provided in the original reading apparatus shown in FIG. 2.

As shown in FIG. 3, the output signals of the CCD sensor 1 are amplified in the amplifier 3 and supplied, in addition to the comparator 11, to a peakhold circuit 23 and a negative input terminal of a comparator 41. An output signal line 23a of said peakhold circuit 23 is connected to one of the contacts of an analog switch 35, of which the other contact is grounded and of which the common contact is connected to a charge-discharge circuit composed of a resistor 37 and a condensor 39. The output of said charge-discharge circuit is supplied to a positive input terminal of the comparator 41 and is divided by resistors 43, 45 to provide a reference voltage for binary encoding in the comparator 11. In this manner the comparator 11 receives a reference voltage for binary encoding corresponding to the charge voltage of the condensor 39.

On the other hand, an output signal line 41a of the comparator 41 is connected to a gate circuit composed of AND gates 29, 31 and an OR gate 27. More detailedly, an input terminal of the AND gate 29 is connected to the output of the comparator 41, and an input terminal of the AND gate 31 is connected to the output of the memory 9. Said AND gates 29, 31 are controlled by a signal line 7b of the read controller 7.

Since the control input to the AND gate 31 is inverted, only one of the AND gates 29, 31 is open at any given moment. The output signals of said AND gates 29, 31 are supplied to the OR gate 27, and the logic sum of said output signals is supplied to a D-flip-flop 25.

Thus, when the output 7b of the read controller 7 is at a high level, the output 41a of the comparator 41 is selected and released from the OR gate 27, and, when the output 7b of the read controller 7 is at a low level, the output 9a of the memory 9 is selected and released from the OR gate 27. The read controller 7 shifts the output 7b to the high level at the reading of the reference member 51, i.e., during the measurement of the shading error data, and to the low level during the original scanning.

The D-flip-flop 25 is latched by read clock signals (see FIG. 4) supplied by the read controller 7 through a signal line 7a in synchronization with each signal readout of one bit from the CCD sensor 1. An output signal line 25a of the D-flip-flop 25 is connected to an input terminal IN of the memory 9 and to a control terminal of the analog switch 35, which is assumed in this case to be connected to the upper signal line 23a when the signal line 25a is at the low level. The read-write timing control of the memory 9 is achieved by the read controller 7 through a signal line 7c. Also the read-write address control of the memory 9 is achieved by an address counter 33 which counts clock signals released on line 7d from the read controller 7 in synchronization with the read-out clock signals on line 7a.

During the reading of the reference member 51, the memory 9 is shifted to the write-mode by the signal line 7c and the output signals of the D-flip-flop 25 are stored in the memory 9 according to the count of the address counter 33. During the original reading, the memory is shifted to the read-mode by the signal line 7e and the shading error data are read from the memory 9 according to the address count of the address counter 33, in synchronization with the signal reading from the CCD sensor 1. The shading error data stored in the memory 9 are binary signals released from the D-flip-flop 25. Consequently, the present embodiment allows one to significantly reduce the memory capacity in comparison with the conventional apparatus in which shading error data of plural bits for each pixel have to be stored.

In the following there will be given an explanation of the function of the above-described structure, while making reference to FIG. 4, which shows signal wave forms on the signal lines 7a, 41a, and at the junctions 3a, 25a, 41b and change of the address 7e of the memory 9.

Figure 4:
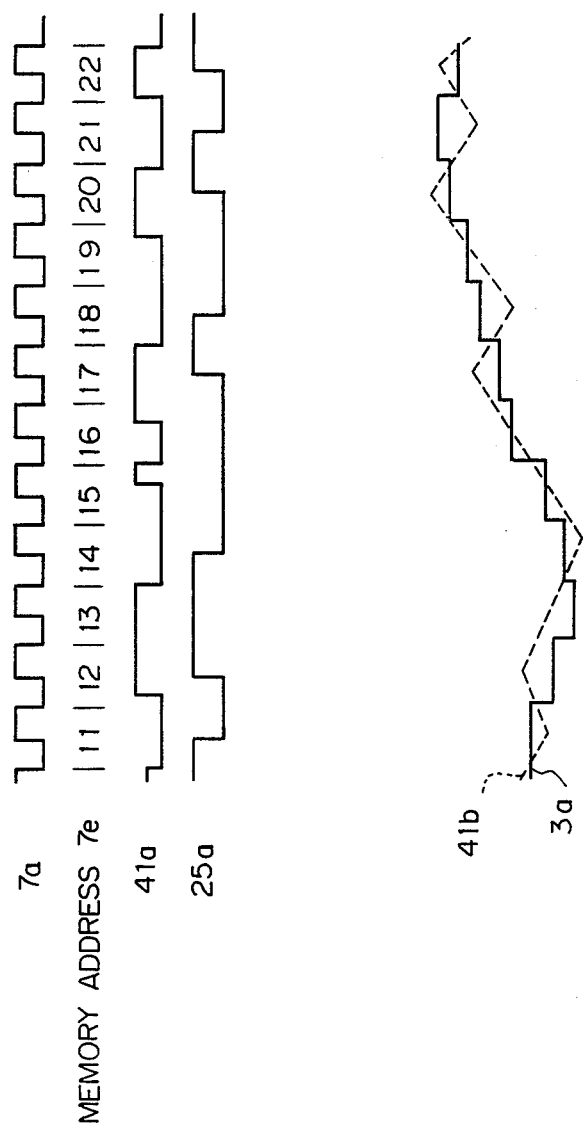
FIG. 4 is a wave form chart showing signals at various junctions in the circuit shown in FIG. 3.

In reading the shading error data, the comparator 41 compares the voltage charged in the condensor 39 through the peak hold circuit 23 shown in FIG. 4, namely the voltage at the junction 41b, with the output on the signal line 3a of the amplifier 3.

In this manner the comparator 41 detects the change in the output of the CCD sensor 1 obtained through the amplifier 3, in comparison with the charged voltage of the condensor 39. Since the charged voltage of the condensor 39 varies following the output of the CCD sensor 1 as will be explained later, the above-mentioned comparing operation of the comparator 41 discriminates whether the current output of the CCD sensor 1 has changed from the output for the immediately preceding pixel, and it is therefore rendered possible to detect unevenness in the output of the CCD sensor 1 resulting from shading error.

The signal on the output signal line 41a of the comparator 41 assumes a high level state when the output of the amplifier 3 is lower, as shown in the third curve of FIG. 4.

In the measurement of the shading error data, the signal line 7b assumes a high level state, whereby the data on the signal line 41a are latched by the D-flip-flop 25 in synchronization with the read clock signals on the signal line 7a. Consequently the signal on the line 25a assumes the form shown by a fourth curve in FIG. 4.

In the case that the voltage on the signal line 3a is higher than that at the junction 41b, the signal line 25a assumes a low level state in synchronization with the clock signals, whereby the analog switch 35 is connected to the signal line 23a. Thus the condensor 39 is charged through the resistor 37 by the output peak value of the amplifier 3 latched by the peak hold circuit 23, thus elevating the voltage at the junction 41b.

On the other hand, when the voltage of the signal line 3a is lower than that at the junction 41b, an inverse operation takes place to shift the analog switch 35 to the grounded side, whereby the condenser 39 is discharged through the resistor 37, thus lowering the voltage at the junction 41b.

In this manner the charged voltage of the condenser 39 is made to follow the output of the CCD sensor 1, by increasing or decreasing the charged voltage of the condenser 39 according to the output of the comparator 41.

Because of the above-described function, the junction 41b shows a wave form corresponding to the output of the CCD sensor 1 as shown by a lowermost curve in FIG. 4. In the above-mentioned function, the data at the junction 25a are stored, in units of a line, divided into pixels, in the memory 9 under the address control by the signal line 7e of the address counter 33a.

In this manner the memory 9 stores the output data of a line from the junction 25a, for indicating the change points approximately representing the changes in the output signals obtained from the CCD sensor 1 by reading the reference member 51.

On the other hand, in the correction of shading error of the image signals obtained by reading the original image, the read controller 7 shifts the signal line 7b to the low level state, thereby enabling entry of the output signals of the memory 9 into the D-flip-flop 25, and provides the signal line 7e with a read-out address corresponding to the signal read-out position from the CCD sensor 1, whereby the analog switch 35 is controlled according to the data read from the memory 9, in a similar manner as in the write-in operation of the shading error data, thus charging and discharging the condenser 39. Since the output 23a of the peak hold circuit 23 varies corresponding to the density of the white or background area of the original, the voltage at the junction 41b varies, in such white area, approximately in the same manner as in the scanning of the reference member 51. Consequently the junction 41b shows a voltage wave form similar to that represented by the lowermost curve in FIG. 4.

The voltage of the junction 41b changing according to the shading error data is given, through the dividing resistors 43, 45, to the comparator 11, thus regulating the threshold level.

Consequently the threshold value used for binary encoding of the output signals obtained by the CCD sensor 1 by reading the original image is regulated according to the shading error to effect a correction of the image signals in response to the shading error, whereby the comparator 11 provides binary signals free from the shading error.

The above-described structure utilizing a charge-discharge circuit, allowing high-speed processing in relatively simple manner in comparison with the conventional circuit utilizing D/A or A/D converter, realizes high-speed shading correction more inexpensively than in the conventional process. It is therefore rendered possible to achieve image processing, involving shading error correction of a higher speed, with the same manufacturing cost as in the conventional technology.

In the conventional circuit utilizing A/D or D/A converter, several bits, 8 bits in most cases, are allotted as the shading error data for each pixel of the CCD sensor for representing various densities and are stored in the memory. On the other hand, in the present embodiment, only one bit of memory is required for each pixel of the CCD sensor, so that the required memory capacity can be several times smaller than in the conventional technology. Also, the use of a high-speed memory device becomes unnecessary since the limited amount of data significantly reduces the time required for memory access.

It is also possible to use plural clock pulses for the D-flip-flop 25 for each pixel of the CCD sensor, thereby preserving and regenerating the wave form of the shading error in a more precise manner.

While in the foregoing embodiment it is assumed that the apparatus is arranged to read a fixed original, it is naturally possible also to read the original by moving it by means for example of a roller. In such structure with a moving original, the reference member for measuring the shading error may be provided in the moving path of the original.

The present invention is applicable also to a structure in which the light transmitted by an image such as a microfilm is read by a CCD sensor.

As will be apparent from the foregoing description, there is provided an image processing apparatus capable of an image processing operation involving inexpensive and high-speed shading error correction with a simple structure.

What I claim is:

1. An image processing apparatus comprising:
   reading means for photoelectrically reading an image;
   a reference member of a reference density;
   detecting means for detecting whether each level of output signals obtained by reading said reference member with said reading means is larger or smaller than a level of a preceding output signal;
   memory means for storing a line of one bit of data, which represent the fact that each level of output signals of said reading means is larger or smaller than a level of a preceding output signal based on a detection result obtained by said detecting means;
   charge-discharge means for charging or discharging a condensor in response to data read out from said memory means; and
   removing means for removing a shading error contained in output signals obtained by reading an original image with said reading means in accordance with a charge voltage of said condensor when the original image is read by said reading means.

2. An image processing apparatus according to claim 1, wherein said detecting means comprises means for generating reference signals following the output signals of said reading means, and means for comparing said reference signal with the output signal of said reading means.

3. An image processing apparatus according to claim 1, wherein said removing means comprises means for binary-encoding the output signals of said reading means in accordance with the charge voltage of said condensor.

4. An image processing apparatus according to claim 3, wherein said binary encoding means comprises means for forming a threshold value for binary encoding in accordance with the charge voltage of said condensor, and means for comparing the threshold value with the output signals of said reading means.

5. An image processing apparatus according to claim 2, wherein said generating means varies a level of the reference signal according to a comparison result obtained by said comparing means.

6. An image processing apparatus according to claim 1, wherein said reading means reads said reference member prior to the reading of the original image.

7. An image processing apparatus according to claim 1, further comprising means for illuminating a member to be read by said reading means, and optical means for guiding reflected light reflected from said member, illuminated by said illuminating means, to said reading means.

8. An image processing apparatus according to claim 1, wherein said charge-discharge means includes a capacitance switching means for controlling application of voltage to said condensor, said switching means being operable in responses to data read out from said memory means.

9. An image processing apparatus according to claim 8, wherein a peak voltage of the output of said reading means is applied to said condensor through said switching means.

* * * * *

UNITED STATES PATENT AND TRADEMARK OFFICE
CERTIFICATE OF CORRECTION

PATENT NO. : 4,947,445
DATED : August 7, 1990
INVENTOR(S) : MASAHIRO SAKAMOTO Page 1 of 2

It is certified that error appears in the above-identified patent and that said Letters Patent is hereby corrected as shown below: ON THE TITLE PAGE:

IN [56] REFERENCES CITED

U.S. PATENT DOCUMENTS, "Tapauchi et al." should read --Tadauchi et al.-- and "Feddle et al." should read --Fedde et al.--.

COLUMN 2

Line 45, "advantage" should read --advantages--.

COLUMN 3

Line 1, "imagebearing" should read --image-bearing--.
Line 5, "brokenlined" should read --broken-lined--.
Line 31, "peakhold" should read --peak-hold--.
Line 33, "peakhold" should read --peak-hold--.

COLUMN 4

Line 21, "signal line 7e" should read --signal line 7c--.
Line 38, "peak hold" should read --peak-hold--.
Line 44, "condenser" should read --condensor--.
Line 62, "the" should read --a-- and
"a" should read --the--.
Line 67, "condenser" should read --condensor--.

COLUMN 5

Line 1, "peak hold" should read --peak-hold--.
Line 6, "condenser" should read --condensor--.
Line 9, "condenser" should read --condensor--.

UNITED STATES PATENT AND TRADEMARK OFFICE
CERTIFICATE OF CORRECTION

PATENT NO. : 4,947,445
DATED     : August 7, 1990
INVENTOR(S) : MASAHIRO SAKAMOTO Page 2 of 2

It is certified that error appears in the above-identified patent and that said Letters Patent is hereby corrected as shown below:

COLUMN 5

Line 12, "condenser" should read --condensor--.
    Line 37, "condenser" should read --condensor-- and "peak hold" should read --peak-hold--.

COLUMN 8

Line 4, "a ca-" should be deleted.
    Line 5, "pacitance" should be deleted.
    Line 7, "responses" should read --response--.

Signed and Sealed this

Fifteenth Day of December, 1992

Attest:

DOUGLAS B. COMER

*Attesting Officer*       *Acting Commissioner of Patents and Trademarks*